(12) United States Patent
Skurkis et al.

(10) Patent No.: US 9,953,781 B2
(45) Date of Patent: Apr. 24, 2018

(54) RESETTABLE SENSOR ASSEMBLY AND SYSTEM

(71) Applicant: GM GLOBAL TECHNOLOGY OPERATIONS LLC, Detroit, MI (US)

(72) Inventors: Richard J. Skurkis, Lake Orion, MI (US); Nancy L. Johnson, Northville, MI (US); Paul W. Alexander, Ypsilanti, MI (US); Dorel M. Sala, Troy, MI (US); Nicholas W. Pinto, IV, Shelby Township, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 15/134,550

(22) Filed: Apr. 21, 2016

(65) Prior Publication Data
US 2016/0314918 A1 Oct. 27, 2016

Related U.S. Application Data

(60) Provisional application No. 62/151,198, filed on Apr. 22, 2015.

(51) Int. Cl.
*H01H 37/32* (2006.01)
*G01D 11/24* (2006.01)

(52) U.S. Cl.
CPC ......... *H01H 37/323* (2013.01); *G01D 11/245* (2013.01)

(58) Field of Classification Search
CPC ............................ H01H 37/323; G01D 11/245
USPC .................... 337/72, 73, 118, 130, 348, 398
See application file for complete search history.

(56) References Cited

U.S. PATENT DOCUMENTS

| | | | | |
|---|---|---|---|---|
| 4,384,267 A | * | 5/1983 | Aoki .................. | H01H 37/765 337/407 |
| 4,524,343 A | * | 6/1985 | Morgan ............. | H01H 61/0107 337/140 |
| 4,675,642 A | * | 6/1987 | Reiferscheid ........ | H01H 37/323 337/140 |
| 4,821,147 A | * | 4/1989 | Jacobs ................ | H05K 7/1404 211/41.17 |
| 5,248,954 A | * | 9/1993 | Chiang ............... | H01H 73/303 337/66 |

(Continued)

*Primary Examiner* — Anatoly Vortman
*Assistant Examiner* — Stephen Sul
(74) *Attorney, Agent, or Firm* — Quinn IP Law

(57) ABSTRACT

A resettable sensor assembly includes a housing having a longitudinal axis and defining a cavity therein. The assembly includes a divider disposed within the cavity and in contact with the housing, at least one electrical contact disposed within the cavity and extending through the divider, and a pin reversibly translatable within the cavity along the axis. The assembly includes at least one actuator element disposed within the cavity and abutting the housing. The element is configured for translating the pin along the axis between a first position wherein the pin contacts the electrical contact and a second position wherein the pin is spaced apart from the electrical contact. The actuator element is formed from a shape memory alloy that is transitionable between an austenite crystallographic phase and a martensite crystallographic phase in response to a thermal activation signal to thereby translate the pin between the first and second positions.

9 Claims, 4 Drawing Sheets

(56) References Cited

U.S. PATENT DOCUMENTS

| | | | |
|---|---|---|---|
| 2006/0232372 A1* | 10/2006 | Yoshikawa | H01H 37/767 337/401 |
| 2008/0117015 A1* | 5/2008 | Leach | H01H 85/303 337/238 |
| 2014/0253280 A1* | 9/2014 | Kim | H01H 85/36 337/139 |
| 2014/0339265 A1* | 11/2014 | Marone | A47L 15/4409 337/140 |

* cited by examiner

RESETTABLE SENSOR ASSEMBLY AND SYSTEM

CROSS-REFERENCE TO RELATED APPLICATIONS

This application claims the benefit of U.S. Provisional Application No. 62/151,198, filed on Apr. 22, 2015, which is hereby incorporated by reference in its entirety.

TECHNICAL FIELD

The disclosure relates to a resettable sensor assembly and a resettable sensor system.

BACKGROUND

Manufacturing equipment, vehicles, and many types of devices are often subject to temperature changes during operation. For example, manufacturing operations may include heating equipment such as ovens, dryers, grinders, and the like that may repeatedly cycle between temperature extremes. Likewise, vehicles such as automobiles, railcars, aircraft, and earth movers may include one or more components, such as gear boxes, brakes, fluid containers, axles, and bearings, that may be subjected to varying temperatures during operation. Similarly, electrically-powered equipment, such as electric motors, timer switches, welding transformers, and welding guns; and mechanical equipment such as pulleys, elevators, and augers may be subject to frictional heating during operation. Processing equipment such as reactors, ovens, coolant pipes, conduits, valves, and conveyors may likewise operate in varying environmental and thermal conditions.

Such equipment, vehicles, and devices may be expected to operate with minimal operator attention or oversight. For example, devices may be shrouded by shields or casings during operation, and equipment may be located where physical and/or visual access is limited.

SUMMARY

A resettable sensor assembly includes a housing having a longitudinal axis and defining a cavity therein. The resettable sensor assembly also includes a divider disposed within the cavity and in contact with the housing. Further, the resettable sensor assembly includes at least one electrical contact disposed within the cavity and extending through the divider, a pin reversibly translatable within the cavity along the longitudinal axis, and at least one actuator element disposed within the cavity and abutting the housing. The actuator element is configured for translating the pin along the longitudinal axis between a first position in which the pin contacts the at least one electrical contact and a second position in which the pin is spaced apart from the at least one electrical contact. The at least one actuator element is formed from a shape memory alloy that is transitionable between an austenite crystallographic phase and a martensite crystallographic phase in response to a thermal activation signal to thereby translate the pin between the first position and the second position.

In one embodiment, the pin extends from the divider towards the at least one electrical contact. The resettable sensor assembly further includes a first actuator element disposed within the cavity and abutting the housing and the divider, and a second actuator element. The second actuator element is disposed within the cavity, spaced apart from the first actuator element, and abuts the housing and the divider. The first actuator element and the second actuator element are configured for translating the pin along the longitudinal axis between a first position in which the pin contacts the at least one electrical contact, and a second position in which the pin is spaced apart from the at least one electrical contact. The first actuator element and the second actuator element are formed from a shape memory alloy that is transitionable between an austenite crystallographic phase and a martensite crystallographic phase in response to a thermal activation signal to thereby translate the pin between the first position and the second position.

A resettable sensor system includes a resettable sensor assembly and a member. The resettable sensor assembly includes a housing having a longitudinal axis and defining a cavity therein. The resettable sensor assembly also includes a divider disposed within the cavity and in contact with the housing, and at least one electrical contact disposed within the cavity. The resettable sensor assembly further includes a pin reversibly translatable within the cavity along the longitudinal axis, and at least one actuator element disposed within the cavity and abutting the housing. The at least one actuator element is configured for translating the pin along the longitudinal axis between a first position in which the pin contacts the at least one electrical contact, and a second position in which the pin is spaced part from the at least one electrical contact. The at least one actuator element is formed from a shape memory alloy that is transitionable between an austenite crystallographic phase and a martensite crystallographic phase in response to a thermal activation signal to thereby translate the pin between the first position and the second position. The member has a surface and is configured for providing the thermal activation signal to the at least one actuator element. The housing is attached to the surface.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
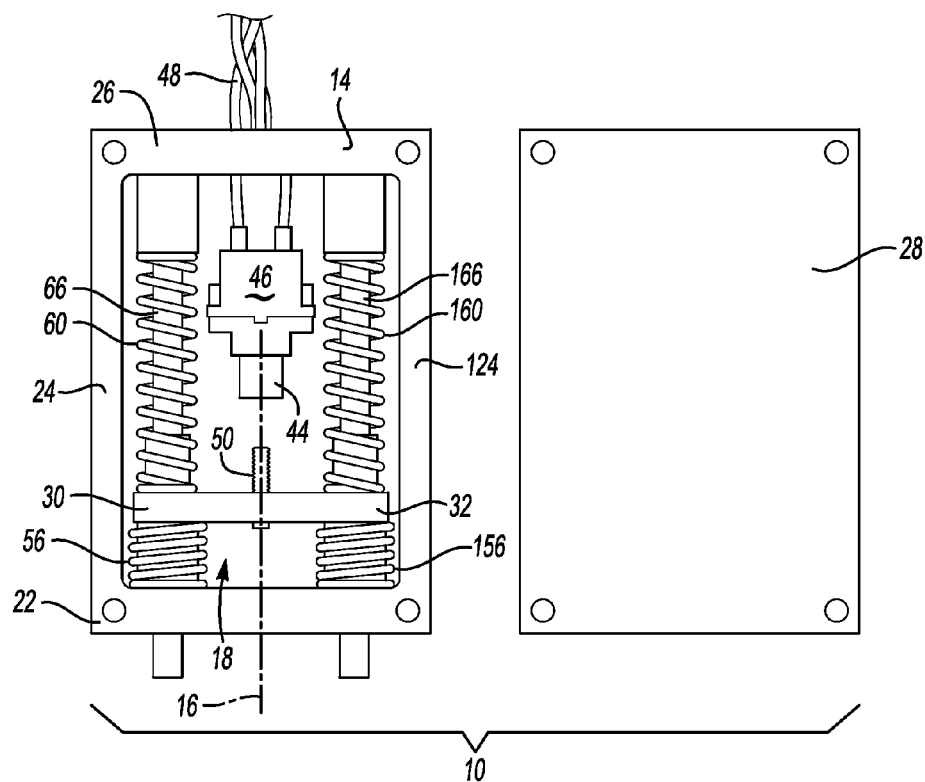
FIG. 1 is a schematic illustration of an exploded top view of a resettable sensor assembly.

Referring to the Figures, wherein like reference numerals refer to like elements, a resettable sensor assembly 10, 110, 210, 310 and resettable sensor system 12 (FIG. 7) are shown.

The resettable sensor assembly 10, 110, 210, 310 and resettable sensor system 12 operate passively, i.e., in response to temperature changes and without an additional electrical power source, and are useful for alerting an operator to a condition in which a temperature of a member 20 (FIG. 7), device, or fluid falls outside of a desired temperature range. The resettable sensor assembly 10, 110, 210, 310 and resettable sensor system 12 are automatically resettable once the condition has ended, i.e., once the temperature of the device or fluid again returns to within the desired temperature range. Therefore, the resettable sensor assembly 10, 110, 210, 310 and resettable sensor system 12 may be useful for temperature monitoring for manufacturing and vehicle applications. For example, the resettable sensor assembly 10 and resettable sensor system 12 may be useful for vehicle applications such as oil temperature monitoring, coolant temperature monitoring, transmission temperature monitoring, axle fluid temperature monitoring, brake caliper fluid monitoring, and the like. However, the resettable sensor assembly 10 and resettable sensor system 12 may also be useful for non-vehicular temperature monitoring applications such as heating equipment, e.g., ovens, dryers, and grinders, that may repeatedly cycle between temperature extremes; electrically-powered equipment, e.g., electric motors, timer switches, welding transformers, and welding guns, that may be subjected to varying temperatures during operation; mechanical equipment, e.g., pulleys, elevators, and augers that may be subject to frictional heating during operation; and processing equipment, e.g., reactors, ovens, coolant pipes, conduits, valves, and conveyors that may likewise operate in varying environmental and thermal conditions.

Referring to FIG. 1, the resettable sensor assembly 10 includes a housing 14 having a longitudinal axis 16. The housing 14 defines a cavity 18 therein along the longitudinal axis 16. The housing 14 may be formed from a thermally-conductive material, such as a metal, e.g., brass or copper, according to the operating conditions of the resettable sensor assembly 10. The housing 14 may be configured to abut and/or attach to a member 20 (FIG. 7), as set forth in more detail below. The housing 14 may have a generally rectangular or box-like shape having a proximal end 22 and opposite sides 24, 124, and may protect other components of the resettable sensor assembly 10 from contaminants during operation. The housing 14 may also have a distal end 26 spaced apart from the proximal end 22 along the longitudinal axis 16. In addition, the housing 14 may include a removable face 28 (FIG. 1) configured to cover the cavity 18 and/or abut the member 20. Alternatively, the housing 14 may not include the removable face 28, and the opposite sides 24, 124 and proximal end 22 may instead directly abut and/or attach to the member 20.

Although not shown, in one embodiment, the cavity 18 may be configured for containing a fluid (not shown) such as an oil-based fluid, a coolant, ambient air, and the like. For example, the fluid may be an oil-based transmission fluid. The fluid may enhance or decrease heat transfer to various components of the resettable sensor assembly 10, as set forth in more detail below. By way of a non-limiting example, for this embodiment, the housing 14 may define a channel (not shown) therein. The channel may be configured to receive a seal (not shown), such as an O-ring formed from an elastomeric material. By way of a non-limiting example, the channel may be defined along a perimeter of the housing 14 and may have any desired shape or configuration.

Figure 2:
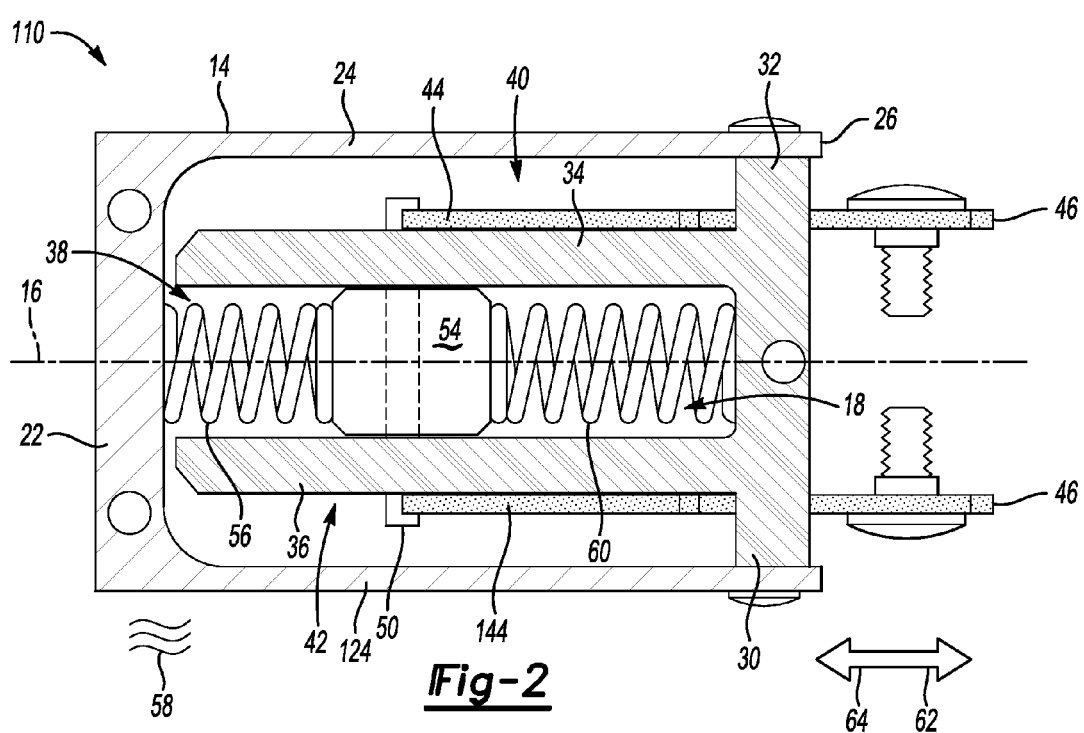
FIG. 2 is a schematic illustration of a top view of another embodiment of the resettable sensor assembly of FIG. 1.

Referring now to FIG. 2, the resettable sensor assembly 110 may also include a divider 30 disposed within the cavity 18 and in contact with the housing 14. The divider 30 may be formed from an insulative, non-conducting material, such as a plastic or a composite. The divider 30 may include a crossbeam 32 that extends between the opposite sides 24, 124 of the housing 14, a first leg 34, and a second leg 36. The first leg 34 extends from the crossbeam 32 and is disposed parallel to the longitudinal axis 16, and the second leg 36 extends from the crossbeam 32, is disposed parallel to the longitudinal axis 16, and is spaced apart from the first leg 34 such that the first leg 34 and the second leg 36 define a chamber 38 therebetween. The first leg 34 may define a first channel 40 therein and the second leg 36 may define a second channel 42 therein.

In another embodiment described with reference to FIG. 1, the divider 30 may only include the crossbeam 32 and may extend between the opposite sides 24, 124 of the housing 14.

Figure 5:
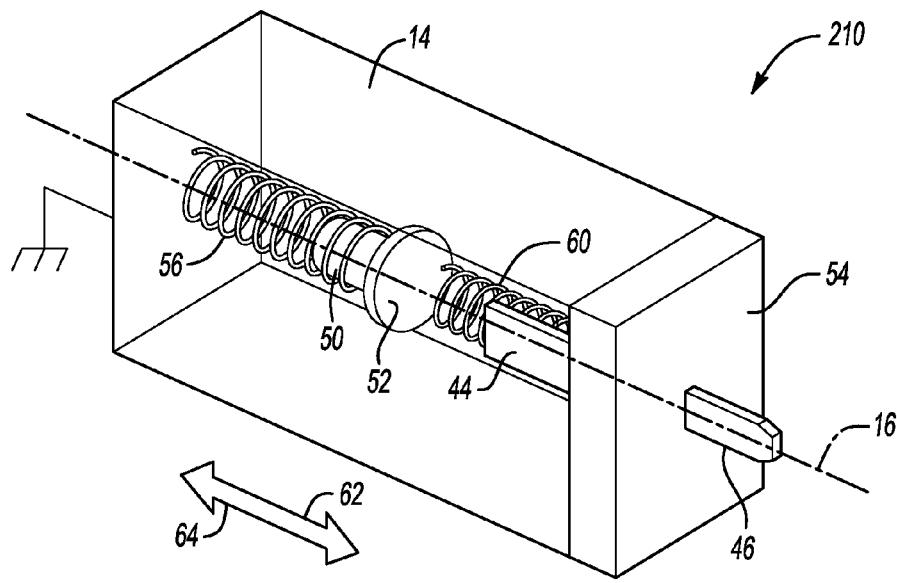
FIG. 5 is a schematic illustration of a perspective view of another embodiment of the resettable sensor assembly of FIG. 1.
Figure 6:
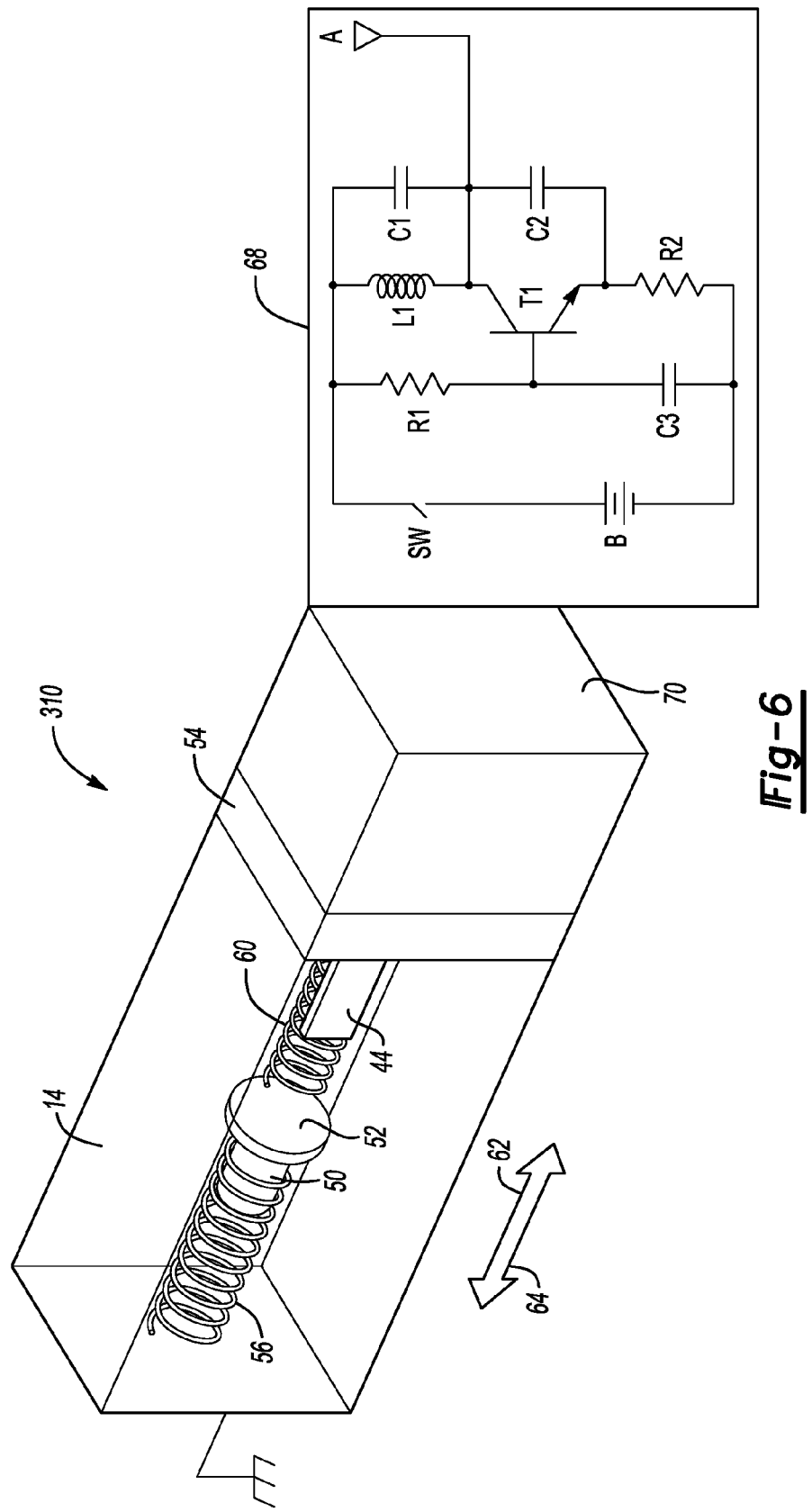
FIG. 6 is a schematic illustration of a perspective view of a further embodiment of the resettable sensor assembly of FIG. 1.

With continued reference to FIG. 2, the resettable sensor assembly 110 further includes at least one electrical contact 44 disposed within the cavity 18 and extending through the divider 30. That is, the resettable sensor assembly 10 may be characterized as an electrical switch which may form a portion of an electrical circuit. The resettable sensor assembly 110 may be a normally-open electrical switch in which a default state is such that electrical current may not pass through the at least one electrical contact 44 to complete an electrical circuit. Alternatively, the resettable sensor assembly 110 may be a normally-closed electrical switch in which a default state is such that electrical current may pass through the at least one electrical contact 44 to complete an electrical circuit. The at least one electrical contact 44 may form or be disposed in electrical communication with a terminal 46 (FIG. 2), which may in turn connect to a transmission wire 48 (FIG. 1), flag (not shown), and/or processor (not shown). In one embodiment, as shown in FIGS. 1, 5, and 6, the resettable sensor assembly 10, 110, 310 may include only one electrical contact 44 that is configured for connecting to the transmission wire 48 at the terminal 46.

Figure 3:
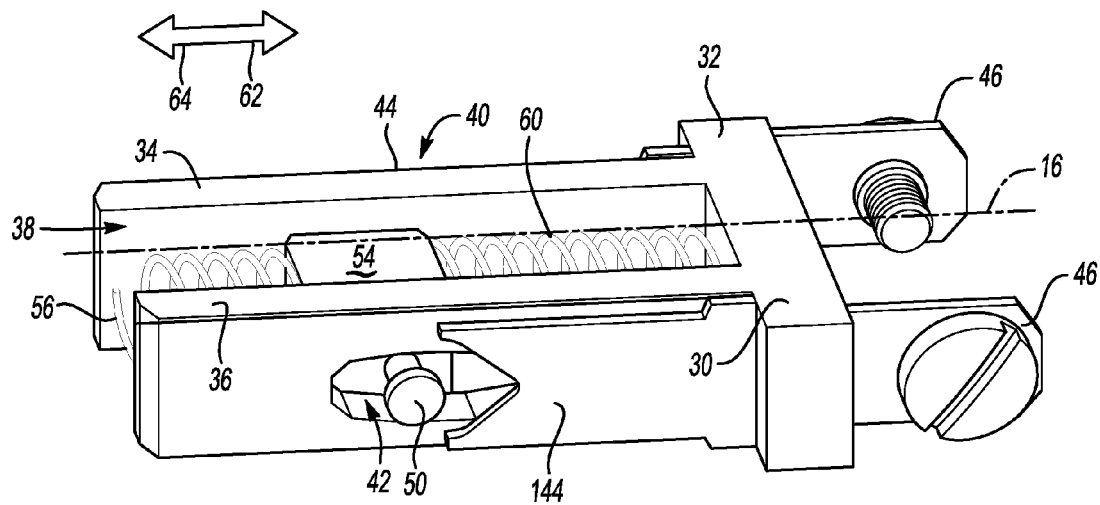
FIG. 3 is a schematic illustration of a side perspective view of a portion of the resettable sensor assembly of FIG. 2.
Figure 4:
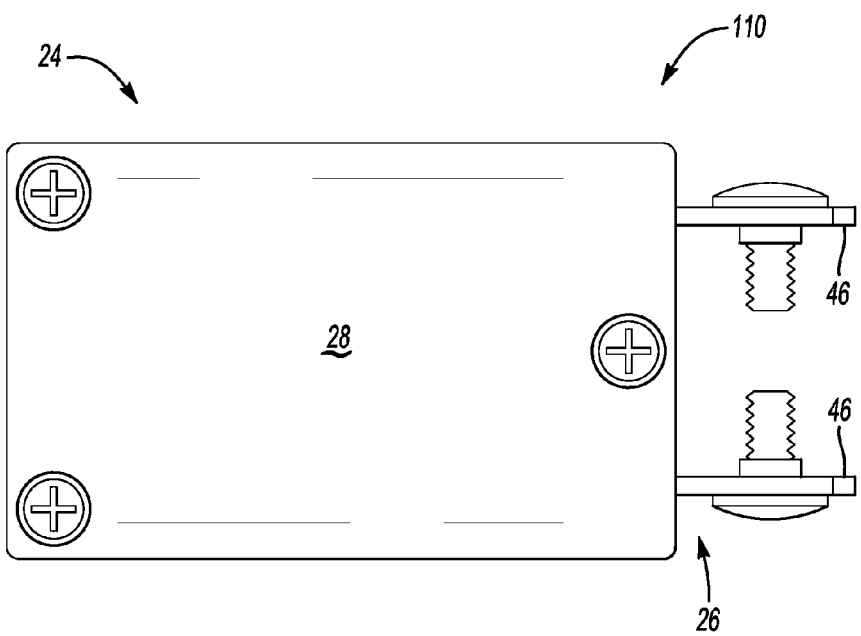
FIG. 4 is a schematic illustration of a top view of the resettable sensor assembly of FIG. 2.

In another embodiment, as shown in FIGS. 2-4, the resettable sensor assembly 110 may include a plurality of electrical contacts 44, 144, e.g., two electrical contacts 44, 144, spaced apart from one another. That is, the resettable sensor assembly 110 may include a first electrical contact 44 disposed within the cavity 18 between the first leg 34 and the housing 14 and extending through the crossbeam 32. The resettable sensor assembly 110 may also include a second electrical contact 44 disposed within the cavity 18 between the second leg 36 and the housing 14 and extending through the crossbeam 32.

Referring again to FIG. 5, the resettable sensor assembly 210 may also includes a plate 52 disposable in contact with the at least one electrical contact 44. The plate 52 may be shaped as a disc and may be formed from an electrically-conductive material such as brass or copper.

As shown in FIGS. 1-3, 5, and 6, the resettable sensor assembly 10, 110, 210, 310 also includes a pin 50 reversibly translatable within the cavity 18 along the longitudinal axis 16. The pin 50 may be formed from a conductive material such as a metal, e.g., brass or copper. The pin 50 may have a generally cylindrical or peg-like shape. During operation, the pin 50 may slide back and forth within the cavity 18 along the longitudinal axis, as set forth in more detail below.

In one embodiment described with reference to FIG. 1, the pin 50 may extend from the divider 30 towards the at least one electrical contact 44, and may be reversibly translatable within the cavity 18 along the longitudinal axis 16.

In another embodiment described with reference to FIGS. 2 and 3, the pin 50 may extend through the first leg 34 and the second leg 36, may be disposed perpendicular to the longitudinal axis 16, and may be reversibly translatable within the cavity 18 along the longitudinal axis 16. That is, the pin 50 may be disposed in and travel within the first channel 40 and the second channel 42 as the pin 50 translates between a first position and a second position, as set forth in more detail below. In particular, the resettable sensor assembly 110 may further include an insulator 54 surrounding the pin 50 within the chamber 38. The insulator 54 may be formed of a non-conductive material, such as a plastic or a composite.

In yet another embodiment described with reference to FIGS. 5 and 6, the pin 50 may be connected to the plate 52 and may be disposed within the cavity 18 along the longitudinal axis 16.

The resettable sensor assembly 10, 110, 210, 310 also includes at least one actuator element 56 disposed within the cavity 18, e.g., within the chamber 38, and abutting the housing 14. For example, for embodiments which include the insulator 54 as described with reference to FIG. 2, the at least one actuator element 56 may be disposed within the chamber 38 and abut the housing 14 and the insulator 54. The at least one actuator element 56 is configured for translating the pin 50 along the longitudinal axis 16 between a first position in which the pin 50 contacts the at least one electrical contact 44 and a second position in which the pin 50 is spaced apart from the at least one electrical contact 44. For embodiments in which the housing 14 includes the plurality of electrical contacts 44, 144, the pin 50 is disposed in contact with the plurality of electrical contacts 44, 144 when the pin 50 is disposed in the first position, and is spaced apart from the plurality of electrical contacts 44, 144 when the pin 50 is disposed in the second position.

The at least one actuator element 56 is formed from a shape memory alloy that is transitionable between an austenite crystallographic phase and a martensite crystallographic phase in response to a thermal activation signal 58 (FIG. 2) to thereby translate the pin 50 between the first position and the second position.

The shape memory alloy is transitionable in response to the thermal activation signal 58 between a first temperature-dependent state and a second temperature-dependent state. In particular, the at least one actuator element 56 may be configured as a first resilient member 60. In one embodiment shown in FIG. 2, the at least one actuator element 56 may abut the housing 14 and the insulator 54. In another embodiment shown in FIG. 1, the first actuator element 56 and the second actuator element 156 may abut the divider 30. In a further embodiment shown in FIG. 5, the at least one actuator element 56 may abut the pin 50. Therefore, as set forth in more detail below, the at least one actuator element 56 may actuate or translate the pin 50 by transitioning between the first temperature-dependent state and the second temperature-dependent state such that the pin 50 slides along the longitudinal axis 16 within the cavity 18.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between the martensite crystallographic phase, i.e., "martensite", and the austenite crystallographic phase, i.e., "austenite". Stated differently, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the shape memory alloy begins to change from the austenite crystallographic phase to the martensite crystallographic phase is known as the martensite start temperature, $M_s$. The temperature at which the shape memory alloy completes the change from the austenite crystallographic phase to the martensite crystallographic phase is known as the martensite finish temperature, $M_f$. Similarly, as the shape memory alloy is heated, the temperature at which the shape memory alloy begins to change from the martensite crystallographic phase to the austenite crystallographic phase is known as the austenite start temperature, $A_s$. The temperature at which the shape memory alloy completes the change from the martensite crystallographic phase to the austenite crystallographic phase is known as the austenite finish temperature, $A_f$.

The shape memory alloy may have any suitable form, i.e., shape. For example, the at least one actuator element 56 may be configured as a shape-changing element such as a wire (not shown), spring (FIGS. 1-3, 5, and 6), tape, band, continuous loop, and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the resettable sensor assembly 10. In one specific example, the shape memory alloy may include nickel and titanium.

Therefore, the at least one actuator element 56 formed from the shape memory alloy may be characterized by a cold state, i.e., when a temperature of the shape memory alloy is below the martensite finish temperature, $M_f$, of the shape memory alloy. Likewise, the at least one actuator element 56 formed from the shape memory alloy may also be characterized by a hot state, i.e., when the temperature of the shape memory alloy is above the austenite finish temperature, $A_f$, of the shape memory alloy. In addition, although not shown, the resettable sensor assembly 10, 110, 210, 310 may include a plurality of actuator elements 56, 156, e.g., the first actuator element 56 and the second actuator element 156, formed from the shape memory alloy. The number of actuator elements 56 may be selected according to a desired stability of the resettable sensor assembly 10, 110, 210, 310 and/or a force required to translate the pin 50, the divider 30, and/or the insulator 54. Further, for the embodiment of the resettable sensor assembly 10, 110, 210, 310 which includes the fluid (not shown), the fluid may be retained within the cavity 18 by the seal and may modify heat transfer to the at least one actuator element 56, e.g., may increase or amplify the magnitude of the thermal activation signal 58, such that the at least one actuator element 56 may change shape and/or stiffness more quickly. Conversely, the fluid may decrease the magnitude of the thermal activation signal 58 such that the at least one actuator element 56 may change shape and/or stiffness more slowly or according to a desired schedule.

The at least one actuator element 56 may expand in length in response to the thermal activation signal 58 to translate the pin 50 along the longitudinal axis 16 in a first direction 62 (FIG. 2) as the at least one actuator element 56 transitions from the austenite crystallographic phase to the martensite crystallographic phase. That is, the at least one actuator element 56 may push on the pin 50, e.g., the insulator 54 surrounding the pin 50, so that the pin 50 slides along the longitudinal axis 16 towards the at least one electrical contact 44.

Referring again to FIG. 2, the resettable sensor assembly 110 may further include a second resilient member 60 disposed within the cavity 18 and abutting the crossbeam 32 and the insulator 54. That is, the second resilient member 60 may be a bias spring and may act on an opposite face of the insulator 54 and/or pin 50. More specifically, the second resilient member 60 may translate the pin 50 along the longitudinal axis 16 in a second direction 64 (FIG. 2) that is opposite the first direction 62 as the at least one actuator element 56 transitions from the martensite crystallographic phase to the austenite crystallographic phase. Therefore, as the shape memory alloy cools, the second resilient member 60 may push the pin 50 in the second direction 64, e.g., away from the at least one electrical contact 44, to thereby reset the resettable sensor assembly 10 to an initial or default position.

Therefore, referring again to FIGS. 1-3, 5, and 6, the shape memory alloy may be selected to change shape and/or stiffness at a specific transformation temperature, Ttrans. For example, the transformation temperature may be selected to correspond to a suitable operating temperature of the device or member 20 (FIG. 7) for which the resettable sensor assembly 10, 110, 210, 310 measures or monitors temperature excursions. As the at least one actuator element 56 transitions from the austenite crystallographic phase to the martensite crystallographic phase, i.e., as the shape memory alloy cools to an excursion temperature that is lower than the transformation temperature, the at least one actuator element 56 may expand and push against the insulator 54 and pin 50 such that the pin 50 translates along the longitudinal axis 16 towards the at least one electrical contact 44. As the pin 50 translates, the pin 50 may also compress the second resilient member 60 such that the pin 50 contacts the at least one electrical contact 44. Depending upon whether the resettable sensor assembly 10, 110, 210, 310 is configured as a normally-open or a normally-closed electrical switch, the pin 50 may complete or disrupt an electrical circuit such that an output signal (not shown) is transmitted through the terminal 46 to an output signal such as a visual signal, e.g., a flag or a color change on a indicator; an auditory signal, e.g., an alarm bell; or a combination thereof.

For example, when the resettable sensor assembly 10, 110, 210, 310 is configured as a normally-open electrical switch, the electrical circuit may close when the shape memory alloy is heated to a temperature above the transformation temperature so that an indicator signal is presented to an operator. Alternatively, when the resettable sensor assembly 10, 110, 210, 310 is configured as a normally-closed electrical switch, the electrical circuit may open when the shape memory alloy is heated to a temperature above the transformation temperature so that an indicator signal is no longer presented to an operator.

For example, during operation of the resettable sensor assembly 10, 110, 210, 310 once the operating temperature of the member 20 has warmed to a temperature at or greater than the transformation temperature, i.e., as the at least one actuator element 56 transitions from the martensite crystallographic phase to the austenite crystallographic phase, the at least one actuator element 56 may contract such that the second resilient member 60 overcomes the spring force of the at least one actuator element 56 configured as the first resilient member 60 and pushes against the insulator 54 and the pin 50 to thereby translate the insulator 54 and the pin 50 in the second direction 64 (FIG. 2), i.e., away from the at least one electrical contact 44. As such, the electrical circuit is interrupted or opened to thereby reset the resettable sensor assembly 10, 110, 210, 310 to the open state.

Conversely, the resettable sensor assembly 10, 110, 210, 310 may be arranged in an opposite configuration. For example, as the at least one actuator element 44 transitions from the austenite crystallographic phase to the martensite crystallographic phase, i.e., as the shape memory alloy cools to an excursion temperature that is lower than the transformation temperature, the at least one actuator element 44 may expand and push against the insulator 54 and the pin 50 such that the insulator 54 and the pin 50 translate along the longitudinal axis 16 towards the at least one electrical contact 44. As the insulator 54 and the pin 50 translate, the insulator 54 and the pin 50 may also expand the second resilient member 60 such that the pin 50 contacts the at least one electrical contact 44 to close the electrical circuit.

Referring again to FIG. 1, the resettable sensor assembly 10 may include a first actuator element 56 disposed within the cavity 18 and abutting the housing 14 and the divider 30. Further, the resettable sensor assembly 10 may include a second actuator element 156 disposed within the cavity 18, spaced apart from the first actuator element 56, and abutting the housing 14 and the divider 30. The first actuator element 56 and the second actuator element 156 are configured for translating the pin 50 along the longitudinal axis 16 between the first position in which the pin 50 contacts the at least one electrical contact 44, and the second position in which the pin 50 is spaced apart from the at least one electrical contact 44.

That is, the first actuator element 56 and the second actuator element 156 may be disposed parallel to one another within the cavity 18 and may each act on, e.g., push against, the divider 30. For this embodiment, the resettable sensor assembly 10 may further include a first rod 66 interconnecting the housing 14 and the divider 30, and a second rod 166 disposed parallel to the first rod 66 and interconnecting the housing 14 and the divider 30.

Referring now to FIGS. 5 and 6, for embodiments which do not include the insulator 54 surrounding the pin 50, the at least one actuator element 56 may act directly on the pin 50, i.e., may translate the pin 50 in the first direction 62 along the longitudinal axis 16 as the shape memory alloy transitions from the austenite crystallographic phase to the martensite crystallographic phase. Similarly, the pin 50 may act directly on the second resilient member 60 such that the pin 50 compresses the second resilient member 60 and contacts the at least one electrical contact 44.

Referring again to FIG. 1, the pin 50 may also be configured as a set screw extending through the divider 30.

The pin 50 may be adjustable in length to vary a sensitivity of the resettable sensor system 12 and control how quickly the pin 50 contacts the at least one electrical contact 44 upon transition of the shape memory alloy from the austenite crystallographic phase to the martensite crystallographic phase.

Referring now to FIG. 5, the resettable sensor assembly 210 may further include the insulator 54 abutting the housing 14, wherein the at least one electrical contact 44 extends through the insulator 54 into the cavity 18. That is, in this embodiment, the resettable sensor assembly 210 may be configured for attachment to only one transmission wire 48 (FIG. 1). For instance, the second resilient member 60 may surround and wrap around the at least one electrical contact 44.

As described with reference to FIG. 6, the resettable sensor assembly 310 may operate wirelessly. For example, the resettable sensor assembly 310 may further include a wireless transmitter 68 electrically connected to the at least one electrical contact 44 and a battery 70 electrically connected to the wireless transmitter 68. For example, the wireless transmitter 68 may be an oscillator as shown in FIG. 6. Activation of the shape memory alloy may power the oscillator on and off. When the oscillator is off, no power may be necessary for signal transmission. The signal may be received by a receiver that is tuned to a frequency that is the same frequency as the oscillator. That is, the wireless transmitter 68 may have the same frequency as the receiver. The battery 70 may be a thermopile that may generate electricity from a temperature difference between the cavity 18 and the housing 14. It is to be appreciated that other electrical circuits and/or equipment may be employed for wireless communication. For example, the resettable sensor assembly 310 may operate wirelessly across networks, electrical circuits, devices, and software associated with Bluetooth® technology, wi-fi technology, ZigBee® technology, and the like.

Figure 7:
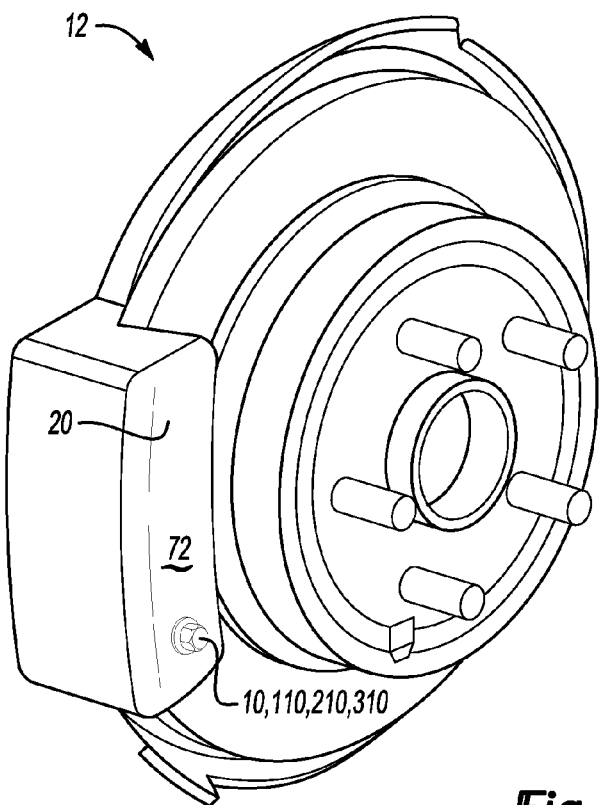
FIG. 7 is a schematic illustration of a perspective view of a resettable sensor system.

Referring now to FIG. 7, a resettable sensor system 12 includes the resettable sensor assembly 10, 110, 210, 310 and the member 20. The member 20 may be any suitable device which requires temperature measurement and/or condition monitoring. For example, the member 20 may be, by way of non-limiting examples, a component of a gear box, a transmission, a fluid reservoir, a conduit, an engine, an axle, a oil pan, a coolant pipe, a brake caliper, and the like. However, the member 20 may also be useful for non-vehicular devices such as heating equipment, e.g., ovens, dryers, grinders, and the like; electrically-powered equipment, e.g., electric motors, timer switches, welding transformers, and welding guns; mechanical equipment, e.g., pulleys, elevators, and augers; and processing equipment, e.g., reactors, ovens, coolant pipes, conduits, valves, and conveyors.

The member 20 has a surface 72, and the housing 14 may be attached to the surface 72. That is, the housing 14 of the resettable sensor assembly 10, 110, 210, 310 may lie flush against the surface 72. As such, the member 20 may be configured for providing the thermal activation signal 58 to the at least one actuator element 56. That is, the member 20 may heat up and increase in temperature during operation and transfer heat to the housing 14 and the at least one actuator element 56 by way of conduction. Therefore, the resettable sensor assembly 10, 110, 210, 310 may detect when a temperature excursion occurs, i.e., when an operating temperature of the member 20 exceeds or falls below the transformation temperature of the shape memory alloy.

The resettable sensor assembly 10, 110, 210, 310 and resettable sensor system 12 may provide cost-effective and energy-efficient, autonomous monitoring. The resettable sensor assembly 10 and resettable sensor system 12 may provide a remote, device-specific overheat signal to warn of temperature excursions beyond or below a desired level or range. The resettable sensor assembly 10, 110, 210, 310 may be located in situ on a device and may threadably attach to the member 20. The resettable sensor assembly 10, 110, 210, 310 is compact and lightweight and can monitor temperature excursions of equipment having small dimensions or tight manufacturing tolerances. For example, the resettable sensor assembly 10, 110, 210, 310 may have a height, sensing depth, or other dimension of from about 2 mm to about 150 mm. Therefore, the resettable sensor assembly 10, 110, 210, 310 may be manufactured to a wide range of specific dimensions or sensing depths according to a desired application. As such, the resettable sensor assembly 10, 110, 210, 310 is tailorable and versatile for many applications. Further, the resettable sensor assembly 10, 110, 210, 310 and resettable sensor system 12 are durable and automatically resettable, provide a combined sensor and actuator, and may be tuned according to a desired temperature alarm limit.

While the best modes for carrying out the disclosure have been described in detail, those familiar with the art to which this disclosure relates will recognize various alternative designs and embodiments for practicing the disclosure within the scope of the appended claims.

The invention claimed is:

1. A resettable sensor assembly comprising:
a housing having a longitudinal axis and defining a cavity therein;
a divider disposed within the cavity and in contact with the housing;
wherein the divider includes:
a crossbeam;
a first leg extending from the crossbeam and disposed parallel to the longitudinal axis; and
a second leg extending from the crossbeam, disposed parallel to the longitudinal axis, and spaced apart from the first leg such that the first leg and the second leg define a chamber therebetween;
at least one electrical contact disposed within the cavity and extending through the divider;
a pin reversibly translatable within the cavity along the longitudinal axis;
at least one actuator element disposed within the cavity and abutting the housing, wherein the actuator element is configured for translating the pin along the longitudinal axis between:
a first position in which the pin contacts the at least one electrical contact; and
a second position in which the pin is spaced apart from the at least one electrical contact;
wherein the at least one actuator element is formed from a shape memory alloy that is transitionable between an austenite crystallographic phase and a martensite crystallographic phase in response to a thermal activation signal to thereby translate the pin between the first position and the second position;
a first electrical contact disposed within the cavity between the first leg and the housing and extending through the crossbeam; and
a second electrical contact disposed within the cavity between the second leg and the housing and extending through the crossbeam;

wherein the pin extends through the first leg and the second leg, is disposed perpendicular to the longitudinal axis, and is reversibly translatable within the cavity along the longitudinal axis.

2. The resettable sensor assembly of claim 1, wherein the at least one actuator element is configured as a first resilient member.

3. The resettable sensor assembly of claim 1, further including an insulator surrounding the pin within the chamber, wherein the at least one actuator element is disposed within the cavity and abuts the housing and the insulator.

4. The resettable sensor assembly of claim 3, further including a second resilient member disposed within the cavity and abutting the crossbeam and the insulator.

5. The resettable sensor assembly of claim 4, wherein the at least one actuator element translates the pin along the longitudinal axis in a first direction as the at least one actuator element transitions from the austenite crystallographic phase to the martensite crystallographic phase.

6. The resettable sensor assembly of claim 5, wherein the second resilient member translates the pin along the longitudinal axis in a second direction that is opposite the first direction as the at least one actuator element transitions from the martensite crystallographic phase to the austenite crystallographic phase.

7. The resettable sensor assembly of claim 1, wherein the first leg defines a first channel therein and the second leg defines a second channel therein, and further wherein the pin is disposed in and travels within the first channel and the second channel as the pin translates between the first position and the second position.

8. The resettable sensor assembly of claim 1, further including: a wireless transmitter electrically connected to the at least one electrical contact; and A battery electrically connected to the wireless transmitter.

9. The resettable sensor assembly of claim 1, wherein the housing includes a removable face configured to cover the cavity.

* * * * *

UNITED STATES PATENT AND TRADEMARK OFFICE
CERTIFICATE OF CORRECTION

PATENT NO.         : 9,953,781 B2
APPLICATION NO.    : 15/134550
DATED              : April 24, 2018
INVENTOR(S)        : Richard J. Skurkis Page 1 of 1

It is certified that error appears in the above-identified patent and that said Letters Patent is hereby corrected as shown below:

In the Claims

Column 12, Line 14, in Claim 8, "A battery electrically" should read --a battery electrically--

Signed and Sealed this
Sixth Day of November, 2018

Andrei Iancu
*Director of the United States Patent and Trademark Office*